Nov. 28, 1939.  W. A. FLUMERFELT  2,181,300
BALL JOINT
Filed May 12, 1937
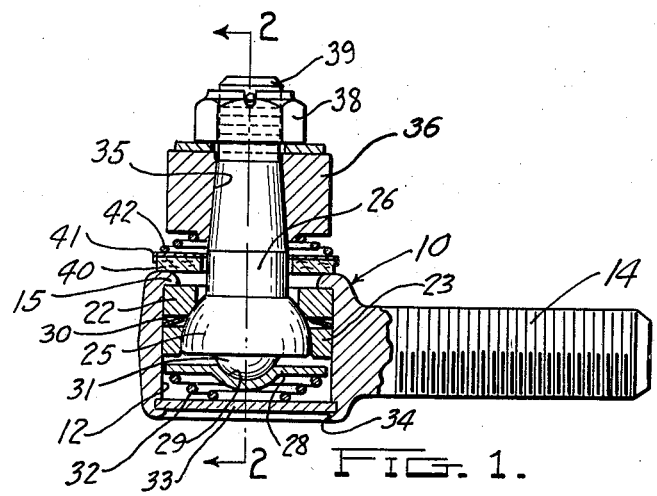
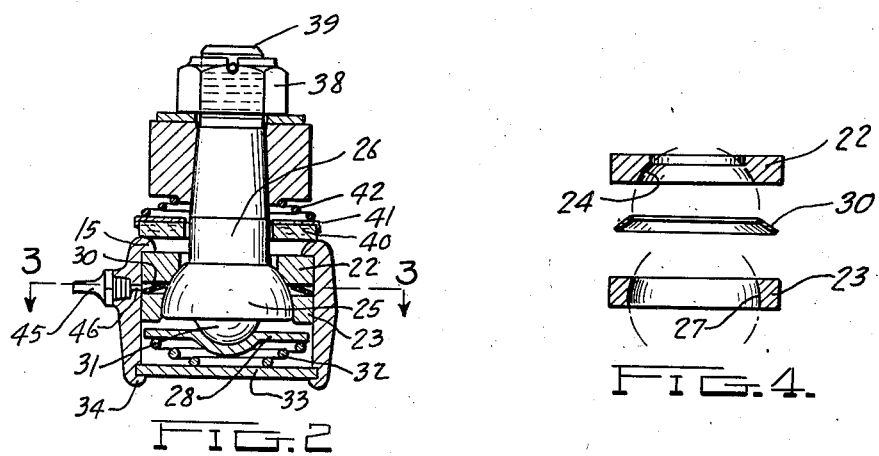
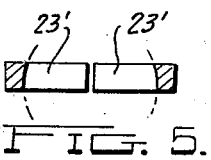
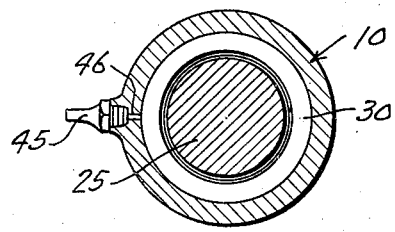
Inventor
William A. Flumerfelt
By Braselton, Whitcomb Davies
Attorney Patented Nov. 28, 1939

2,181,300

UNITED STATES PATENT OFFICE 2,181,300

BALL JOINT

William A. Flumerfelt, Columbus, Ohio, assignor to The Columbus Auto Parts Company, Columbus, Ohio, a corporation of Ohio Application May 12, 1937, Serial No. 142,249

4 Claims. (Cl. 287—90)

This invention relates to joints and is more particularly directed to articulated joints adaptable for use in tie rod and drag link constructions for automotive vehicles.

An object of the invention resides in the provision of a joint of this character wherein the resistance to torque or rotary movement may be of a different value with respect to the resistance to oscillation or tilting movement and wherein the resistance to torque may be varied without effecting comparatively free oscillation between the ball stud and housing.

Another object contemplates means to exert a uniform pressure between the ball and ball seats in all positions of tilt of the ball stud.

Another object of the invention is the provision of a ball stud and cooperative bearing elements operating on different radii about a common center whereby the dimension of the joint of this character is decreased.

A further object resides in the provision of a joint wherein the elements are arranged for automatic adjustment to compensate for wear.

A still further object is the provision of means to permit relative rotary movement between the ball stud and ball seat.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a longitudinal vertical sectional view of a joint structure incorporating the invention;

Figure 2 is a sectional view taken substantially on a line 2—2 of Figure 1;

Figure 3 is a sectional view taken substantially on a line 3—3 of Figure 2;

Figure 4 is a sectional view of the ball seats or bearing members in disassembled relationship;

Figure 5 is a sectional view of another form of bearing ring shown in Figure 4.

While the invention has been illustrated as incorporated in a tie rod construction suitable for use in automotive vehicles, it is to be understood that its use is contemplated wherever it may be found to have utility.

Referring to the drawing in detail, a tie rod or other joint housing 10 has been illustrated, having an internal bore 12 and a threaded projection or tenon 14. The tenon 14 is adapted to be adjustably received in the open end of a tie rod (not shown) and suitably secured therein to retain the joint housing 10 in adjusted position with respect to the rod. One end of the housing 10 is formed with an inturned shoulder portion 15 to partially close one end of the bore 12. The bore 12 in housing 10 is substantially cylindrical to receive an annular seat member 22 preferably pressed into the bore and in engagement with the shoulder 15, to prevent movement of the seat with respect to the housing 10. The seat member 22 is provided with a segmental spherical inner bearing surface 24 engageable with a spherical segmental ball portion 25 of a ball stud 26. The bore 12 also receives an annularly shaped bearing or seat member 23 having an inner bearing surface 27 also engageable with the ball portion 25 of the stud 26. Between the seat 22 and seat member 23 is positioned a resilient member or spring washer 30 which urges the ring 23 downwardly into wedging engagement between the interior of housing 10 and the ball portion 25.

The bore 12 also receives a seat member 28 formed with a concave central bearing portion or surface 29 engageable with a second segmental spherical ball portion 31 having a radius shorter than that of the ball portion 25, both of said spherical surfaces 25 and 29 being preferably generated about a common center.

The ring shaped seat 23, spring 30, ball stud 26 and seat member 28 are retained in housing 15 by means of a spring 32 and closure 33, the closure 33 being held in one end of the housing 10 by swaging or otherwise turning over an edge portion 34 thereof into contact with a surface of disc 33. The spring 32 also serves to apply pressure to urge the bearing surface or disc-like member 29 into close engagement with ball portion 31 as well as urge the ball portion 25 into contact with the bearing surface 24.

As bearing seat 23 is slidable in the housing, the spring washer 30 tends to urge the seat into contact with the equatorial region of the ball portion 25 at all times. In this arrangement with the slidable bearing seat 23 in engagement with the equatorial region of the ball stud, the angle of inclination between the spherical portion of the ball stud and the interior bearing surface of seat 23 is very slight or of a wedge-like configuration. Therefore, the spring washer 30 exerts a downward pressure upon the bearing seat 23 so that the latter is caused to wedgingly engage the ball stud at the most effective area of the ball stud to take up wear and at the same time provide a high friction component such that the bearing seat 23 will tend to rotate with the ball stud when the latter is subjected to rotative forces, and yet which permits relative oscillatory action of the ball stud when the latter is subjected to forces causing the same to oscillate. Moreover, the frictional component between the relatively fixed bearing seat 22 and the movable bearing seat 23 is increased by reason of the frictional pressure exerted by the spring washer 30 which tends to oppose rotation of the bearing seat 23 with the ball stud. The arrangement thus provided insures substantially uniform pressure on the contacting bearing surfaces during relative movements between the ball stud 26, ring member 23 and the housing 10. Wear between the moving parts is at all times compensated for as the springs 30 and 32 urge the elements into engagement at all times.

If it is desired to provide a bearing surface which may be wedged against the wall of the housing and thereby increase the frictional component acting on the ball stud, the bearing seat may be split or fabricated in two parts or halves 23' as shown in Figure 5, in which instance the parts or seats would be expanded into wedging engagement with the bore in housing 10, due to the action of the spring washer 30 and the ball portion 25 of the stud. In such an arrangement, the frictional component between seat 23 and the stud and housing wall is increased and any tendency toward looseness caused by wear between the parts is automatically compensated for.

The ball stud 26 is preferably slightly tapered as at 35 to receive an arm 36 which is formed as a part of the stub axle of the vehicle (not shown), the arm being retained on the stud by means of a nut 38 engageable with the threaded extremity 39 of the ball stud 26. The joint housing 10 is closed by means of a resilient gasket or washer 40 of felt or other suitable material and is provided with an opening through which the ball stud 26 extends. The felt washer 40 is held in close engagement with the housing 10 by means of a metallic cup-like member 41 and a spring 42 interposed between the member 41 and arm 36 when assembled therewith. This arrangement prevents the ingress of dirt, water and other foreign matter which would be detrimental to the life and efficient operation of the joint structure. In order to further enhance the life of the structure, means are provided to supply lubricant to the interior of the device, in the form of a suitable lubricant fitting 45 secured in an opening in the housing 10 and communicating with the housing interior through an opening or bore 46.

From the foregoing, it will be noted that the joint structure is particularly adaptable for use where it is desired that the resistance to rotary movement between the elements of the joint be greater than the resistance to oscillatory movement, and that the device is particularly capable of being produced by present day high speed production methods because of the use of a minimum of parts, requiring a minimum number of machine operations, and simplification of assembly of the structure.

It is apparent that within the scope of the invention, modifications and different arrangements may be made other than is herein disclosed, and the present disclosure is illustrative merely, the invention comprehending all variations thereof.

What I claim is:

1. In a joint construction, the combination of a housing having a hollow interior; a stud member having a segmental spherically shaped portion projecting into the housing; means positioned in the housing engageable with the non-equatorial region of the spherically shaped portion of the stud for limiting the longitudinal movement thereof; a spring for urging said stud member into constant engagement with the stud member positioning means; bearing means engageable with the spherically shaped portion of the stud member at the equatorial region thereof; and a second spring interposed between the stud member positioning means and said bearing means for urging the latter into constant engagement with the spherically shaped portion of the stud member.

2. In a joint construction, a housing; a stud member having a plurality of spherically shaped bearing surfaces of different dimensions; bearing means in said housing having a bearing surface engageable with the larger of said spherically shaped surfaces of said stud member and substantially at the equatorial region thereof; a spring washer engageable with said bearing means for urging the latter into constant engagement with the equatorial region of one of the spherically shaped bearing surfaces; a second bearing means engageable with another spherically shaped surface of the stud; and spring means for urging the second mentioned bearing means into constant engagement with the stud member.

3. In a joint construction, a housing having a cylindrical bearing surface; a ball stud having a plurality of bearing surfaces of different dimensions; a seat member interposed between said cylindrical bearing surface and one of the bearing surfaces of said stud; a second seat member interposed between said cylindrical bearing surface and said bearing surface of said stud; resilient means between said seat members for urging said second seat member into engagement with said stud surface; a third seat member engageable with another of the bearing surfaces of said stud; and means to apply pressure on the cooperating bearing surfaces.

4. In a joint construction, a housing having an interior bore; a ball stud having a spherically shaped bearing surface; an annular seat member fixed in said bore and contacting with one portion of the spherically shaped bearing surface; a second seat member slidably mounted in said bore and arranged for engagement with another portion of the spherically shaped bearing surface; spring means interposed between said seat members for constantly urging the movable seat member into engagement with the spherical surface of the ball stud; and means for urging the ball stud into contact with the annular seat member.

WILLIAM A. FLUMERFELT.